United States Patent
Drees et al.

(10) Patent No.: US 9,136,989 B2
(45) Date of Patent: Sep. 15, 2015

(54) METHOD AND APPARATUS FOR REDUCING CARRIER LEAKAGE

(71) Applicant: MOTOROLA SOLUTIONS, INC, Schaumburg, IL (US)

(72) Inventors: Dennis M. Drees, Hoffman Estates, IL (US); Bryan A. Hoon, Elgin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 72 days.

(21) Appl. No.: 14/050,934

(22) Filed: Oct. 10, 2013

(65) Prior Publication Data

US 2015/0103948 A1    Apr. 16, 2015

(51) Int. Cl.
| H04B 1/04 | (2006.01) |
| H04L 1/20 | (2006.01) |
| H03C 1/62 | (2006.01) |

(52) U.S. Cl.
CPC ..................................... *H04L 1/206* (2013.01)

(58) Field of Classification Search
CPC ................ H04B 1/525; H04B 15/06
USPC .............................................. 455/114.2, 126
See application file for complete search history.

(56) References Cited

U.S. PATENT DOCUMENTS

| 4,122,448 | A | 10/1978 | Martin |
| 5,396,196 | A | 3/1995 | Blodgett |
| 6,766,157 | B1 | 7/2004 | Hunzeker et al. |
| 7,376,200 | B2 | 5/2008 | Demir et al. |
| 7,864,882 | B2 | 1/2011 | Anderson et al. |
| 8,055,205 | B2 | 11/2011 | Wurm |
| 8,145,153 | B2 | 3/2012 | Nitsche |
| 8,175,549 | B2 | 5/2012 | Faust et al. |
| 8,446,937 | B1 | 5/2013 | Dark et al. |
| 2004/0132424 | A1 | 7/2004 | Aytur et al. |

FOREIGN PATENT DOCUMENTS

| WO | 0057545 A1 | 9/2000 |
| WO | 2004095686 A8 | 11/2004 |

*Primary Examiner* — Lee Nguyen
(74) *Attorney, Agent, or Firm* — Barbara R. Doutre; Steven A. May

(57) ABSTRACT

In an embodiment, an apparatus comprises an in-phase-quadrature (IQ) signal amplifier having an IQ baseband input, an IQ mixer input connected to the IQ signal amplifier, a carrier leakage detector connected to outputs of the IQ mixer, and a carrier-null offset signal generator connected to the carrier leakage detector. The IQ mixer is configured to be driven by an IQ carrier signal. The carrier leakage detector is configured to output an in-phase leakage level measurement and a quadrature leakage level measurement in the absence of an IQ baseband signal at the IQ baseband input. The carrier-null offset signal generator is configured to (i) inject an in-phase carrier-null offset signal based on the in-phase leakage level measurement and (ii) inject a quadrature carrier-null offset signal based on the quadrature leakage level measurement.

24 Claims, 4 Drawing Sheets

METHOD AND APPARATUS FOR REDUCING CARRIER LEAKAGE

BACKGROUND OF THE INVENTION

In a radio frequency (RF) transmitter, an IQ modulator is used for modulating source information from in-phase (I) and quadrature (Q) signal components. Baseband I and Q signals are commonly used for modulation, as these signals or baseband waveforms are easier to manipulate as compared to a higher frequency or bandpass waveform signals. Translation from baseband signals to an RF bandpass signal is achieved by mixing the baseband IQ signal components with a reference signal (generated by a local oscillator (LO)) at a carrier frequency. The nonlinear mixing and summation of the two baseband IQ signals results in a modulated RF signal that may then be amplified and transmitted. Direct conversion transmitters use an LO synchronized to the exact frequency of the carrier in order to directly translate the baseband signals to RF frequencies.

Unfortunately, IQ modulators are susceptible to carrier leakage such that a significant amount of energy at the carrier frequency is present at the output of the transmitter. Carrier leakage can originate from DC offsets generated in the baseband source, or can be injected by baseband signal processing elements or imbalances within the mixers, any of which potentially impose unacceptable amounts of energy at the carrier frequency. Accordingly, there is a need for measuring and reducing the amount of carrier leakage.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
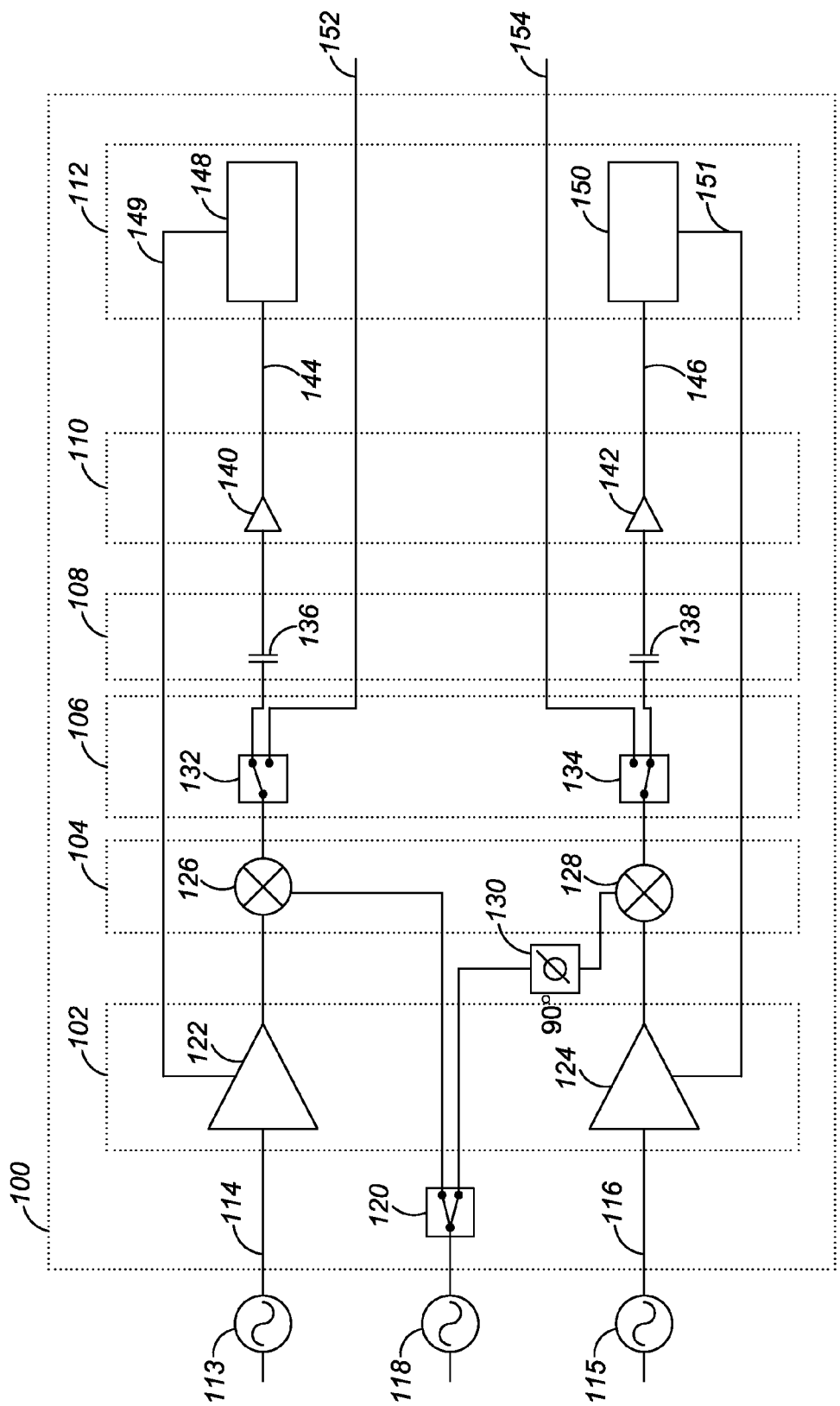
FIG. 1 is a diagram of an apparatus employing a carrier-null offset signal generator, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, an apparatus comprises an in-phase-quadrature (IQ) signal amplifier having an IQ baseband input, an IQ mixer input connected to the IQ signal amplifier, a carrier leakage detector connected to RF outputs of the IQ mixer, and a carrier-null offset signal generator connected to the carrier leakage detector. The IQ mixer is configured to be driven by an IQ carrier signal. The carrier leakage detector is configured to output an in-phase leakage level measurement and a quadrature leakage level measurement in the absence of an IQ baseband signal at the IQ baseband input. The carrier-null offset signal generator is configured to (i) inject an in-phase carrier-null offset signal based on the in-phase leakage level measurement and (ii) inject a quadrature carrier-null offset signal based on the quadrature leakage level measurement.

FIG. 1 is a diagram of an apparatus 100 employing a carrier-null offset signal generator, in accordance with some embodiments. As shown in FIG. 1, apparatus 100 includes an in-phase-quadrature (IQ) signal amplifier 102, an IQ mixer 104, a carrier leakage detector 110, and a carrier-null offset signal generator 112. The IQ mixer 104 is connected to the IQ signal amplifier 102, the carrier leakage detector 110 is connected to outputs of the IQ mixer 104, and the carrier-null offset signal generator 112 is connected to the carrier leakage detector 110. Each of IQ signal amplifier 102, IQ mixer 104, carrier leakage detector 110, and carrier-null offset signal generator 112 may receive a respective in-phase signal and quadrature signal from baseband signal sources 113, 115, and each may output a respective in-phase signal and quadrature signal.

IQ signal amplifier 102 may include an IQ baseband input configured to receive an IQ baseband signal. The IQ signal amplifier may additionally include an IQ carrier-null offset input configured to receive an IQ carrier-null offset signal from carrier-null offset signal generator 112. The IQ signal amplifier may include an in-phase signal amplifier 122 and a quadrature signal amplifier 124, each configured to receive a respective one of an in-phase baseband signal input 114 and a quadrature baseband signal input 116. Amplifiers 122 and 124 may each be further configured to receive a respective one of an in-phase carrier-null offset signal on line 149 and a quadrature carrier-null offset signal on line 151. IQ signal amplifier 102 may be single-ended amplifiers or differential amplifiers, and may take other forms as well.

IQ mixer 104 may be configured to be driven by a carrier signal from a local oscillator (LO) 118 or other source. The IQ mixer may include an in-phase mixer 126 and a quadrature mixer 128, and could take the form of an IQ current commutating mixer such as a Gilbert cell, for example. The IQ mixer 104 may include passive or active components, and may include other types of devices such as multipliers, heterodyning devices, etc. Apparatus 100 may further include a splitter 120 configured to divide the carrier signal sourced by the LO 118 into two or more signals, and the in-phase and quadrature mixers 126, 128 may be configured to receive a respective carrier signal from the splitter 120. The IQ mixer 104 might further include a phase shifter 130 configured to phase shift one or both of the respective carrier signals received by the in-phase and quadrature mixers 126, 128 to achieve a 90 degree phase offset between the in-phase carrier signal applied to the in-phase mixer 126 and the quadrature carrier signal applied to the quadrature mixer 128. The phase shifter 130 may be interposed between splitter 120 and one or both of mixers 126 and 128 and may be configured to provide a respective relative ninety degree phase offset (e.g., an alternative embodiment may impose a +45 degree offset and −45 degree offset on the respective carriers). Those having skill in the art will recognize that IQ mixer 104 may take other forms as well without departing from the scope of the claims.

Carrier leakage detector 110 may be configured to output an in-phase leakage level measurement as a first output 144 of the carrier leakage detector and a quadrature leakage level measurement as a second output 146 of the carrier leakage detector. The carrier leakage detector 110 may be configured to output one or more of the measurements in an absence of an IQ baseband signal at the IQ baseband input. The carrier leakage detector 110 could take the form of a signal level detector, such as an RF to DC detector, for example, a root-mean-squared detector, a log detector, a diode detector, any other signal level detector, or any combination of these or any other signal level detector as known in the art. As shown in FIG. 1, the carrier leakage detector 110 may include an in-phase carrier leakage detector 140 that produces the first output 144, that is, the in-phase leakage level measurement, and a quadrature carrier leakage detector 142 that produces the second output 146, that is, the quadrature leakage level measurement. In various embodiments, the carrier leakage detectors 140, 142 may be RF power detectors and the leakage level measurements may be RF power levels and/or voltages. Other variations of the carrier leakage detector 110 are possible as well, such as any signal level detector as known in the art.

Carrier-null offset signal generator 112 may be configured to generate one or both of an in-phase carrier-null offset signal 149 based on the in-phase leakage level measurement 144 and a quadrature carrier-null offset signal 151 based on the quadrature leakage level measurement 146. The carrier-null offset signal generator 112 then feeds back, that is, injects, the one or both of the in-phase carrier-null offset signal 149 and the quadrature carrier-null offset signal 151 to the IQ signal amplifier 102, and more particularly feeds back the in-phase carrier-null offset signal 149 to in-phase signal amplifier 122 and feeds back the quadrature carrier-null offset signal 151 to the quadrature signal amplifier 124. As shown in FIG. 1, the carrier-null offset signal generator 112 could include an in-phase carrier-null offset signal generator 148 that generates the in-phase carrier-null offset signal 149 and a quadrature carrier-null offset signal generator 150 that generates the quadrature carrier-null offset signal 151. The in-phase and quadrature carrier-null offset signal generators each could take the form of (and/or include) a successive approximation algorithm/register (SAR) and/or a control circuit (including either a microcontroller/microprocessor or a sequential logic circuit), in combination with a digital-to-analog converter (DAC), among other possibilities. The DAC could be configured to generate a respective voltage and/or current as the respective one of the in-phase and quadrature carrier-null offset signals 149, 151. Carrier-null offset signal generator 112 may take other forms as well.

Apparatus 100 further includes an IQ signal switch 106 and an alternating current (AC) coupler 108, among other possibilities. The switch might include in-phase switch 132 and quadrature switch 134 configured to selectively connect the outputs of IQ mixer 104 to an RF summing device followed by an RF power amplifier or to the carrier leakage detector 110, for example. A control circuit may be provided and configured to connect carrier leakage detector 110 to the outputs of IQ mixer 104 and to engage carrier-null offset signal generator 112 to inject the in-phase and quadrature carrier-null offset signals. The control circuit may be processor based, and/or may also include a finite state machine to control the carrier-null calibration procedure described herein. The control circuit may be incorporated into the generator 112, or it may reside elsewhere. The AC coupler 108 could include one or more coupling circuits, such as capacitors 136 and 138, and may be configured to connect the carrier leakage detector 110 to the outputs of the IQ mixer 104, as one possibility. For example, a first capacitor 136 of the AC coupler 108 may couple the in-phase mixer 126 to the in-phase carrier leakage detector 140, and a second capacitor 138 of the AC coupler 108 may couple the quadrature mixer 128 to the quadrature carrier leakage detector 142. In another embodiment, the coupling circuits of the AC coupler 108 may take the form of microstrip couplers, as an example. Those having skill in the art will understand that apparatus 100 may include additional and/or different components, and that not all components pictured in FIG. 1 need be included in apparatus 100.

Figure 2:
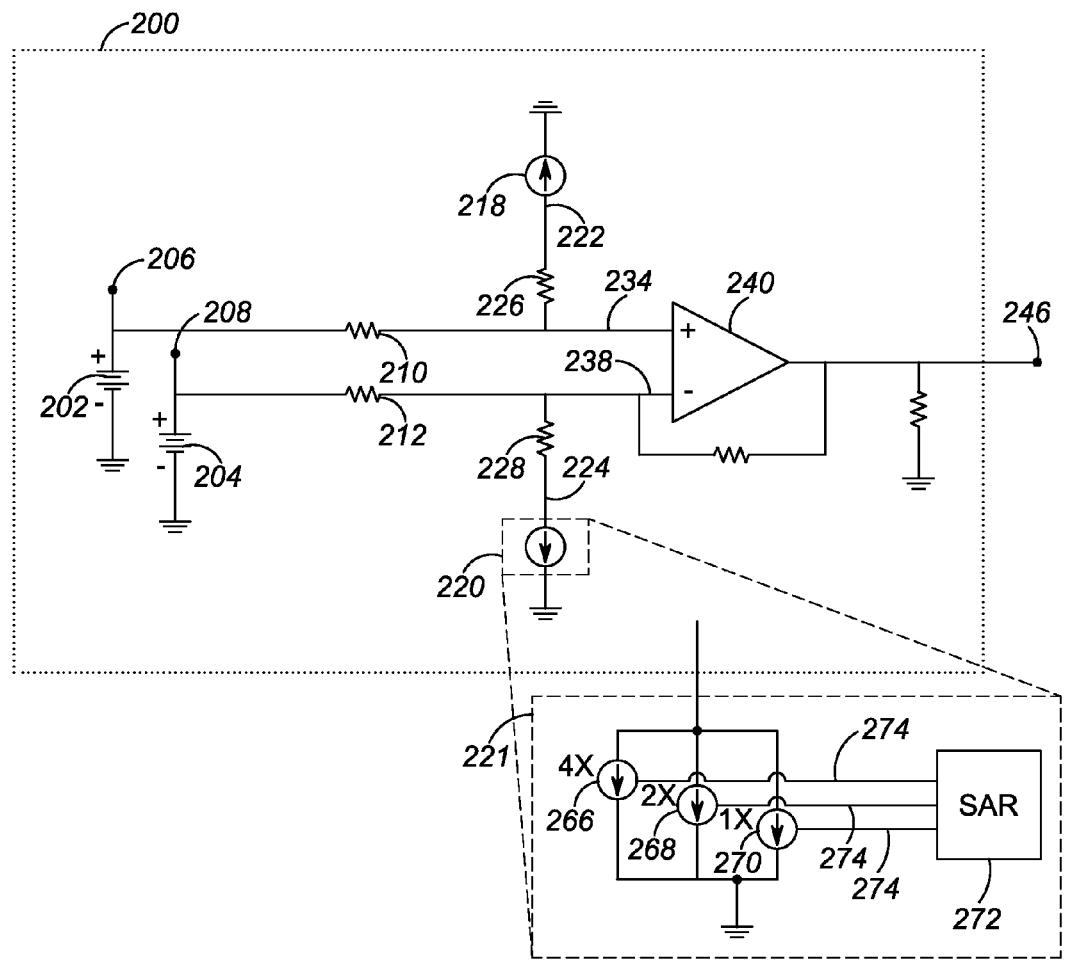
FIG. 2 is a diagram of a baseband amplification circuit comprising an amplifier and portions of a carrier-null offset signal generator, in accordance with some embodiments.

FIG. 2 is a diagram of a baseband amplification circuit 200 having an amplifier 240, such as amplifiers 122 and 124, and portions of a carrier-null offset signal generator, such as carrier-null offset signal generators 148 and 150, in accordance with some embodiments. As shown in FIG. 2, amplification circuit 200 includes direct current (DC) voltage sources 202 and 204 that output respective DC voltage signals $V_{pos}$ and $V_{neg}$. A differential baseband signal may also be applied at nodes 206, 208. These signals are received by respective resistors 210 and 212 having resistances of 1 kOhm (though other resistances are possible).

Amplification circuit 200 further includes current sources 218 and 220, as well as operational amplifier 240 having a positive input 234 and a negative input 238, and output 246. The current sources 218, 220 sink respective current signals $I_{adj\_pos}$ at node 222 and $I_{adj\_neg}$ at node 224. The current provided by the current sources 218, 220 in turn develops an incremental voltage across respective resistors 226 and 228, resulting in corresponding offset voltages at inputs 234 and 238 of operational amplifier 240. In an embodiment, the resistance of resistors 226 and 228 is 10 kOhm, though other resistances are possible.

Table 1 shows example output voltages $V_{out}$ produced at the output 246 of operational amplifier 240 in response to various input voltages $V_{pos}$ and $V_{neg}$ and input currents $I_{adj\_pos}$ and $I_{adj\_neg}$ respectively applied to the inputs 234, 238 of the operational amplifier

TABLE 1

| $V_{pos}$ | $V_{neg}$ | $I_{adj\_pos}$ | $I_{adj\_neg}$ | $V_{out}$ |
|---|---|---|---|---|
| 1.75 V | 1.75 V | 1 µA | 1 µA | 1.7472 V |
| 1.76 V | 1.75 V | 1 µA | 1 µA | 1.7672 V |
|  |  | 11 µA | 1 µA | 1.7472 V |
| 1.75 V | 1.76 V | 1 µA | 1 µA | 1.7372 V |
|  |  | 1 µA | 11 µA | 1.7472 V |
| 1.75 V | 1.74 V | 1 µA | 1 µA | 1.7572 V |
|  |  | 6 µA | 1 µA | 1.7472 V |
| 1.74 V | 1.75 V | 1 µA | 1 µA | 1.7272 V |
|  |  | 1 µA | 21 µA | 1.7472 V |

As shown in Table 1, $V_{out}$ shifts from nominal when an offset voltage $V_{pos}$ exists between $V_{pos}$ and $V_{neg}$, but can be reacquired by sinking current $I_{adj\_pos}$ or $I_{adj\_neg}$ through respective current source 218 or 220. Note that voltage sources 202 and 204 are adjusted simply for purposes of artificially introducing an offset voltage and to demonstrate how current sources 218 and 220 may be used to correct for such offsets. In normal operation, an offset that may cause carrier leakage may be inadvertently introduced by imbalances in one or more of the many circuit elements such as the amplifier 240, the mixer stages, bias circuits, filter stages, etc., and might not be present at the input to amplifier 240. However, by introducing a corrective offset at the inputs 234, 238 to amplifier 240, the aggregate offset present within the various IQ modulator components may be significantly reduced, thereby significantly reducing carrier leakage.

With respect to the simulated offsets of Table 1, for example, $V_{out}=1.7472$ V when $V_{pos}$ and $V_{neg}$ are both=1.75 V and $I_{adj\_pos}$ or $I_{adj\_neg}$ are both=1 µA. $V_{out}$ shifts when $V_{pos}=1.76$ V and $V_{neg}=1.75$ V. $V_{out}$ can be reacquired by sinking $I_{adj\_pos}=11$ µA through current source 220.

Referring again to FIG. 2, an embodiment of the carrier-null offset generator is depicted with respect to controllable current source 220, which is depicted in greater detail as circuit 221. In this embodiment, a digital-to-analog converter in the form of controllable current sources 266, 268, and 270 is provided. A binary control signal 274 may be used to turn on or off the current sources 266, 268, 270 to obtain a desired amount of sink current from current source 220 (and/or similarly current source 218). The current sources 266, 268, 270 may be configured to each provide a different amount of current, such as in a proportional relationship of 1×, 2×, and 4×, in order to obtain 1×, 2×, 3×, 4×, 5×, 6×, 7× and 8× a base amount of current x (such as 1 µA). That is, if it is determined that a desired amount of current is 6 µA and a transistor making up each current sources 266, 268, 270 is configured such that x is 1 µA, then 6 µA may be obtained by turning on the second and third current sources, that is, transistors, thus providing 2 µA and 4 µA respectively. Or if 5 µA is desired to provide the necessary offset, then the first and third current sources/transistors would be turned on to provide 1 µA and 4 µA, respectively. The binary control signal 274 is generated by a carrier-null offset signal generator, such as carrier-null offset signal generators 148 and 150, which may take the form of a microprocessor or microcontroller, or a successive approximation register (SAR) device (collectively referred to as a SAR device 272). SAR device 272 may also generate binary control signals for a digital to analog converter (DAC)/programmable current source 218. Using programmable current sources 218, 220 (one embodiment of which is programmable current source 221), a carrier-null offset signal, such as carrier-null offset signals 149 and 151, in the form of an offset voltage may be introduced at inputs 234 and 238 of operational amplifier 240. In an alternative embodiment, digitally controlled or otherwise programmable voltage sources could be used instead (or in addition).

With reference to FIG. 1, an embodiment of each of carrier-null offset signal generators 148,150 includes a SAR device, such as SAR device 272, operating in combination with a DAC. The SAR device implemented in each of carrier-null offset signal generators 148, 150 is configured to receive an in-phase and quadrature leakage level measurement 144 and 146, respectively. The DAC implemented in each of carrier-null offset signal generators 148, 150 receives, from the SAR device, a digital representation of a DC offset correction signal.

Figure 3:
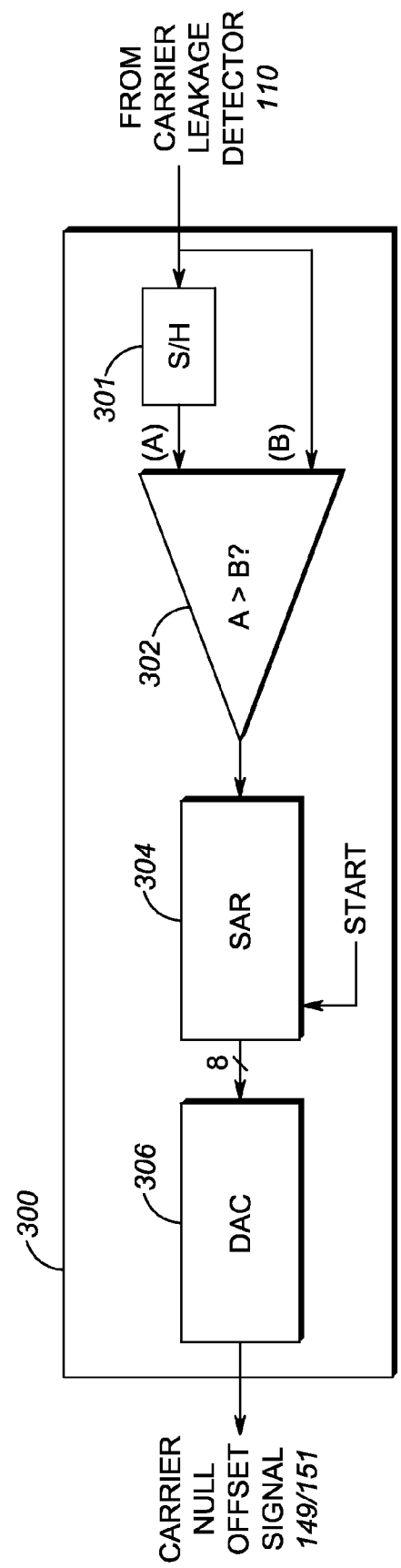
FIG. 3 is a diagram of a carrier-null offset signal generator, in accordance with some embodiments.

Referring now to FIG. 3, a simplified diagram of a carrier-null offset signal generator 300, such as carrier-null offset signal generators 148 and 150, is provided, in accordance with some embodiments. As shown, carrier-null offset signal generator 300 includes a sample-hold device 301 coupled to a comparator 302, a SAR device 304 coupled to the comparator, and a digital-to-analog converter (DAC) 306 coupled to the SAR device. The carrier-null offset signal generator 300 carries out a training sequence that generates an offset correction signal by identifying the combination of currents and corresponding voltage offsets that minimizes the measured carrier leakage.

In one embodiment, the carrier-null offset signal generator 300 generates an offset correction signal through implementation of a successive approximation algorithm. For example, suppose that a quantity to be adjusted (that is, a current offset or a voltage offset) is represented as a digital 8-bit number (ranging between 0 (i.e., 0 0 0 0 0 0 0 0) and 255 (i.e., 1 1 1 1 1 1 1 1)). The successive approximation algorithm works by first setting, in the sample-hold device 301 and in a register of the SAR device 304, an initial reference value. Preferably, the initial reference value, or level, is in the middle of the quantity range. For example, for an 8-bit number, the initial reference value/level could be '0 1 1 1 1 1 1 1,' which is a value in the middle of its range. The sample-hold device 301 receives, from carrier leakage detector 110 (that is, from in-phase carrier leakage detector 140 or from quadrature carrier leakage detector 142, depending upon whether this is carrier-null offset signal generator 148 or 150), the leakage level measurement output by the corresponding detector, that is, in-phase leakage level measurement 144 output by in-phase carrier leakage detector 140 or quadrature leakage level measurement 146 output by quadrature carrier leakage detector 142. The sample-hold device 301 then provides the reference value (A) to comparator 302 from carrier leakage detector 110. Comparator 302 also receives, from carrier leakage detector 110 a subsequent leakage level measurement(s) (B) output by the corresponding detector, that is, in-phase leakage level measurement 144 output by in-phase carrier leakage detector 140 or quadrature leakage level measurement 146 output by quadrature carrier leakage detector 142. The comparator 302 compares the reference value (A) received from the sample-hold device 301 to the (active or current) leakage level measurement (B) received from the carrier leakage detector 110 and conveys a result of the comparison to the SAR device 304. The SAR device 304 then adjusts the value that it stores based on the comparison. One or more iterations of this algorithm may be performed by the carrier-null offset signal generator 300, and the value stored in the SAR device 304 after completion of the iteration then may be injected into IQ amplifier as the carrier-null offset signal 149, 151.

In one embodiment, the comparator 302 may adjust the value stored in the SAR device 304 only when the leakage level measurement (B) received from the by carrier leakage detector 110 is less than the reference value (A) stored by the sample-hold device 301. That is, when the reference value (A) is greater than the leakage level measurement (B), the comparator 302 may convey the leakage level measurement (B) to the SAR device 304, and when the reference value (A) is less than the leakage level measurement (B), the comparator 302 may convey or maintain the reference value (A) to the SAR device. The SAR device 304 then adjusts its stored value, that is, stores the value received from the comparator, and the adjusted value then becomes the new carrier-null offset signal 149, 151 for a next iteration of this algorithm. In other embodiments, the comparator 302 may adjust the value stored in the SAR device 304 upwards when the leakage level measurement (B) received from the by carrier leakage detector 110 is less than the reference value (A) and may adjust the value stored in the SAR device 304 downwards when the leakage level measurement (B) received from the by carrier leakage detector 110 is greater than the reference value (A).

By way of example and for the purpose of illustrating the principles of the present invention, in a first iteration or SAR master reset, the sample-hold circuit 301 provides an initial reference value (A) to comparator 301 from carrier leakage detector 110. As noted above, the initial reference value (A) may start out with the value stored by the register of the SAR device 304 in the middle of the range of the possible reference values, that is, as '0 1 1 1 1 1 1 1' for an 8-bit digital word (see the "Initial" row of Table 2 below). This digital word (the 8-bit number) is provided to DAC 306 generating an initial carrier-null offset signal and the level of the carrier leakage measurement is referenced. On subsequent iterations, if the carrier leakage measurement (B) is greater than the reference value (A), then the 8-bit number stored in the SAR device 304 is increased so that it falls, for example, in the middle of the upper half of the range. If the carrier leakage measurement (B) is smaller than the reference value (A), then the 8-bit number stored in the SAR device 304 is decreased so that it falls, for example, in the middle of the lower half of the range. That is, the new reference value stored in the SAR device 304 would be 'X 0 1 1 1 1 1 1,' where X is either '1' (if the 8-bit number is increased) or '0' (if the 8-bit number is decreased) (see the row Iteration No: '1' in Table 2).

TABLE 2

(X = 1 if A > B, X = 0 if A < B)

| Iteration No: | | | | SAR Contents | | | | |
|---|---|---|---|---|---|---|---|---|
| Initial | 0 | 1 | 1 | 1 | 1 | 1 | 1 | 1 |
| 1 | X | 0 | 1 | 1 | 1 | 1 | 1 | 1 |
| 2 | $S_7$ | X | 0 | 1 | 1 | 1 | 1 | 1 |
| 3 | $S_7$ | $S_6$ | X | 0 | 1 | 1 | 1 | 1 |
| 4 | $S_7$ | $S_6$ | $S_5$ | X | 0 | 1 | 1 | 1 |
| 5 | $S_7$ | $S_6$ | $S_5$ | $S_4$ | X | 0 | 1 | 1 |
| 6 | $S_7$ | $S_6$ | $S_5$ | $S_4$ | $S_3$ | X | 0 | 1 |
| 7 | $S_7$ | $S_6$ | $S_5$ | $S_4$ | $S_3$ | $S_2$ | X | 0 |
| 8 | $S_7$ | $S_6$ | $S_5$ | $S_4$ | $S_3$ | $S_2$ | $S_1$ | X |
| Result | $S_7$ | $S_6$ | $S_5$ | $S_4$ | $S_3$ | $S_2$ | $S_1$ | $S_0$ |

In other words, during the first iteration, a current value B of the detector 110 output is compared against an "Initial" hold value, that is, reference value (A) (depicted in Table 2 as the row "Initial"). If A>B, then the first most significant bit (MSB) of the 8-bit word, depicted as X in row Iteration No: 1 of Table 2, is set to '1' (X=1) and the row Iteration No: 1 of Table 2, with X set to '1', is stored in the register of the SAR device 304. Further, the current value B becomes the new reference value of A stored by the sample-hold circuit 301. On the other hand, if A<B, then X (of row Iteration No: 1) is held to '0' (X=0), again row Iteration No: 1 of Table 2 is stored in the register of the SAR device 304 except that X=0 instead of X=1, and the current value of A is maintained as the reference value A by the sample-hold circuit 301 (that is, A remains unchanged). As indicated by Table 2, the next or second MSB in row Iteration No: 1 is set to '0'. The value of this first MSB of the 8-bit word, that is, $S_7$, then remains the same with respect to the value stored in the register of the SAR device 304 (and as represented by Table 2) through the subsequent iterations of the algorithm.

In a second iteration, a new current value (B) output by the detector 110 is compared against the reference value (A) (row Iteration No: 1 of Table 2), which is now '[X=0 or 1] 0 1 1 1 1 1 1'. If A>B, then the second MSB of the 8-bit word, depicted as X in row Iteration No: 2 of Table 2, is set to '1' (X=1) and the row Iteration No: 2 of Table 2, with X set to '1', is stored in the register of the SAR device 304. Further, the current value B becomes the new reference value of A stored by the sample-hold circuit 301. If A<B, then X (of row Iteration No: 2) is held to '0' (X=0) and the row Iteration No: 2 of Table 2, with X set to '0', is stored in the register of the SAR device 304. Further, the current value of A is maintained as the reference value A in the sample-hold circuit 301. As indicated by Table 2, the next or third MSB in row Iteration No: 2 is set to '0'. The value of this second MSB of the 8-bit word, that is, $S_6$, then remains the same with respect to the value stored in the register of the SAR device 304 (and as represented by Table 2) through the subsequent iterations of the algorithm.

As depicted in Table 2, this process then continues through eight iterations to the LSB, each iteration changing a next bit in the value stored in the register of the SAR device 304, to the right of the bit changed in the previous iteration.

In other words, in the first iteration, it is determined in which half of the range the measured level lies compared to the reference level. In the second iteration, this algorithm is repeated on that half of the range, to determine in which correct quarter of the range the measured level lies. The algorithm is applied recursively, adjusting the register each time, such that all bits stored in the SAR device 304 will be completely adjusted to its resolution after eight iterations.

The carrier-null offset signal generator may include an analog-to-digital converter (ADC) configured to convert the in-phase or quadrature leakage level measurement to a discrete digital representation of a corresponding carrier leakage measurement. The generator 148, 150 may be configured to iteratively adjust its output control signal to adjust the injected offset voltage while measuring the effect as seen in carrier leakage measurement.

Figure 4:
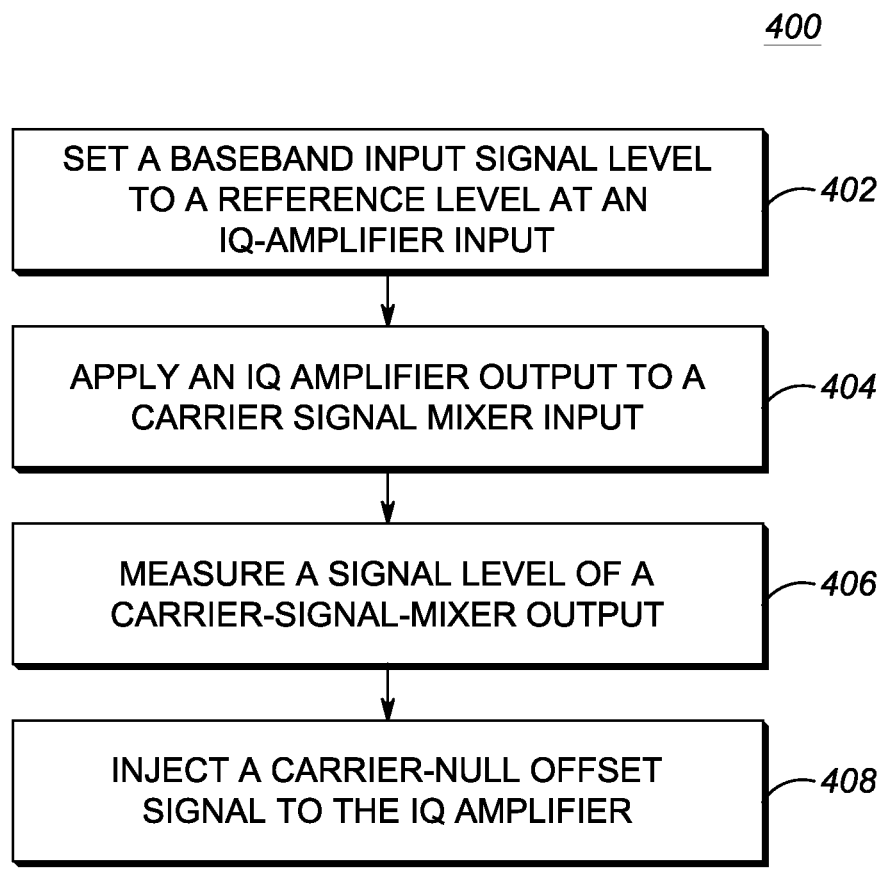
FIG. 4 is a flowchart of a method of injecting a carrier-null offset signal, in accordance with some embodiments.

FIG. 4 is a flowchart of a method 400 of injecting a carrier-null offset signal, in accordance with some embodiments. As shown in FIG. 4, method 400 begins at step 402 with the apparatus 100 setting a baseband input signal level to a reference level at an input to the IQ amplifier 102 (as described above with reference to FIGS. 1 and 2). At step 404, the apparatus 100 applies an output of the IQ amplifier 102 to an input of carrier signal mixer, that is, IQ mixer, 104.

In an embodiment, apparatus 100 is configured to selectively bypass carrier leakage detector 110 and carrier-null offset signal generator 112, that is, to route an output of carrier signal mixer 104 to an RF summing device, via mixer output signals 152 and 154 and switch 106, that is, switches 132 and 134, when in normal operation. On the other hand, when operating in a carrier-leakage reduction mode of operation, the apparatus 100 is configured to direct the output of the IQ amplifier and mixer 102, 104, via switch 106, to the carrier leakage detector 110. The operation of switch 106 may be controlled by a control circuit, or processing device, of the apparatus 100, among other possibilities.

When operating in a carrier-leakage reduction mode of operation, method 400 continues at step 406, with the apparatus 100 obtaining a first measurement of a carrier leakage signal level of an output of the carrier signal mixer 104. At step 408, the apparatus 100, that is, the carrier-null offset signal generator 112, generates a first carrier-null offset signal based on the first measurement of the carrier leakage signal level and feeds back 149, 151, that is, injects, the first carrier-null offset signal to the IQ amplifier 102.

In an embodiment, the apparatus 100 then obtains a second measurement of the carrier signal mixer 104 output signal level, subsequent to injecting the first carrier-null offset signal. The apparatus 100, that is, the carrier-null offset signal generator 112, generates a second carrier-null offset signal based on the second measurement of the carrier leakage signal level and feeds back 149, 151, that is, injects the second carrier-null offset signal to the IQ amplifier 102. In further embodiments, the apparatus 100 could similarly obtain a third, a fourth, and further additional measurements and continue refining the injected carrier-null offset signal based on further measurements of the carrier signal mixer 104 output signal level until carrier leakage is reduced to a threshold level.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus comprising:
   an in-phase-quadrature (IQ) signal amplifier having an IQ baseband input;
   an IQ mixer connected to the IQ signal amplifier, and the IQ mixer configured to be driven by an IQ carrier signal;
   a carrier leakage detector connected to outputs of the IQ mixer, the carrier leakage detector configured to output an in-phase leakage level measurement and a quadrature leakage level measurement in the absence of an IQ baseband signal at the IQ baseband input;
   a carrier-null offset signal generator connected to the carrier leakage detector configured to inject an in-phase carrier-null offset signal based on the in-phase leakage level measurement and to inject a quadrature carrier-null offset signal based on the quadrature leakage level measurement.

2. The apparatus of claim 1 wherein the carrier leakage detector is an RF to DC converter.

3. The apparatus of claim 1 wherein the carrier leakage detector is selected from the group consisting of a root-mean-squared detector, a log detector, and a diode detector.

4. The apparatus of claim 1 wherein the carrier-null offset signal generator comprises a digital-to-analog converter configured to generate a first voltage as the in-phase carrier-null offset signal and a second voltage as the quadrature carrier-null offset signal.

5. The apparatus of claim 1 wherein the carrier-null offset signal generator comprises a digital-to-analog converter configured to generate a first current as the in-phase carrier-null offset signal and a second current as the quadrature carrier-null offset signal.

6. The apparatus of claim 1 wherein the carrier-null offset signal generator comprises a successive approximation register.

7. The apparatus of claim 1 further comprising an IQ signal switch to selectively connect the carrier leakage detector to the outputs of the IQ mixer.

8. The apparatus of claim 1 further comprising an AC coupler configured to connect the carrier leakage detector to the outputs of the IQ mixer.

9. The apparatus of claim 1 further comprising a control circuit configured to connect the carrier leakage detector to the outputs of the IQ current commutating mixer, and configured to engage the carrier-null offset signal generator to inject the in-phase carrier-null offset signal and quadrature carrier-null offset signal.

10. The apparatus of claim 1, wherein the IQ mixer comprises an in-phase (I) mixer and a quadrature (Q) mixer, and the apparatus further comprises:
an in-phase switch to selectively connect the carrier leakage detector to the output of the in-phase (I) mixer; and
a quadrature switch to selectively connect the carrier leakage detector to the output the quadrature (Q) mixer.

11. The apparatus of claim 10, further comprising:
a first capacitor coupling the carrier leakage detector to the outputs of the in-phase (I) mixer via the in-phase switch; and
a second capacitor coupling the carrier leakage detector to the outputs of the quadrature (Q) mixer via the quadrature switch.

12. An apparatus comprising:
an in-phase signal amplifier having an in-phase baseband input and a quadrature signal amplifier having a quadrature baseband input;
an in-phase current commutating mixer and a quadrature current commutating mixer connected to the in-phase signal amplifier and the quadrature signal amplifier, respectively, and the in-phase current commutating mixer and the quadrature current commutating mixer configured to be driven by an in-phase carrier signal and a quadrature carrier signal, respectively;
a carrier leakage detector connected to an output of the in-phase current commutating mixer and connected to an output of the quadrature current commutating mixer, the carrier leakage detector configured to output an in-phase leakage level measurement based on a signal output of the in-phase current commutating mixer in the absence of an in-phase baseband signal at the in-phase baseband input and a quadrature leakage level measurement based on a signal output of the quadrature current commutating mixer in the absence of a quadrature baseband signal at the quadrature baseband input; and
a carrier-null offset signal generator connected to the carrier leakage detector configured to inject an in-phase carrier-null offset signal based on the in-phase leakage level measurement and to inject a quadrature carrier-null offset signal based on the quadrature leakage level measurement.

13. The apparatus of claim 12 wherein the carrier-null offset signal generator comprises a successive approximation register.

14. The apparatus of claim 12 further comprising an IQ signal switch to selectively connect the carrier leakage detector to the outputs of the in-phase and quadrature current commutating mixers.

15. The apparatus of claim 12 further comprising an AC coupler configured to connect the carrier leakage detector to the outputs of the in-phase and quadrature current commutating mixers.

16. The apparatus of claim 12 further comprising a control circuit configured to connect the carrier leakage detector to the outputs of the in-phase and quadrature current commutating mixers, and configured to engage the carrier-null offset signal generator to inject the in-phase carrier-null offset signal and quadrature carrier-null offset signal.

17. The apparatus of claim 12 wherein the carrier leakage detector is an RF to DC converter.

18. The apparatus of claim 12 wherein the carrier leakage detector is selected from the group consisting of a root-mean-squared detector, a log detector, and a diode detector.

19. The apparatus of claim 12, wherein the IQ mixer comprises an in-phase (I) mixer and a quadrature (Q) mixer, and the apparatus further comprises:
an in-phase switch to selectively connect the carrier leakage detector to the output of the in-phase (I) mixer; and
a quadrature switch to selectively connect the carrier leakage detector to the output the quadrature (Q) mixer.

20. The apparatus of claim 19, further comprising:
a first capacitor coupling the carrier leakage detector to the outputs of the in-phase (I) mixer via the in-phase switch; and
a second capacitor coupling the carrier leakage detector to the outputs of the quadrature (Q) mixer via the quadrature switch.

21. A method comprising:
setting a baseband input DC reference level where signal I(t), Q(t) are set to zero at an input to an IQ amplifier;
applying an IQ amplifier output, from the IQ amplifier, to a carrier signal mixer input;
obtaining a first measurement of a signal level of an output of the carrier signal mixer; and
injecting a carrier-null offset signal to the IQ amplifier based on the first measurement.

22. The method of claim 21, further comprising:
subsequent to injecting the carrier-null offset signal based on the first measurement, obtaining a second measurement of the carrier signal mixer output signal level; and
injecting the carrier-null offset signal based on the second measurement.

23. The method of claim 21, further comprising:
iteratively measuring a signal level of the output of the carrier signal mixer and adjusting the carrier-null offset signal.

24. The method of claim 21, further comprising:
selectively coupling the output of the carrier signal mixer to a carrier leakage detector.

* * * * *